G. W. SHAFFER.
FRICTION CLUTCH.
APPLICATION FILED JAN. 23, 1911.

1,029,147.

Patented June 11, 1912.

3 SHEETS—SHEET 1.

Witnesses:
Jacob Oberst, Jr.
Ella C. Queckhahn

George W. Shaffer, Inventor.
By Emil Neuhart
Attorney.

G. W. SHAFFER.
FRICTION CLUTCH.
APPLICATION FILED JAN. 23, 1911.
1,029,147.
Patented June 11, 1912.
3 SHEETS—SHEET 2.
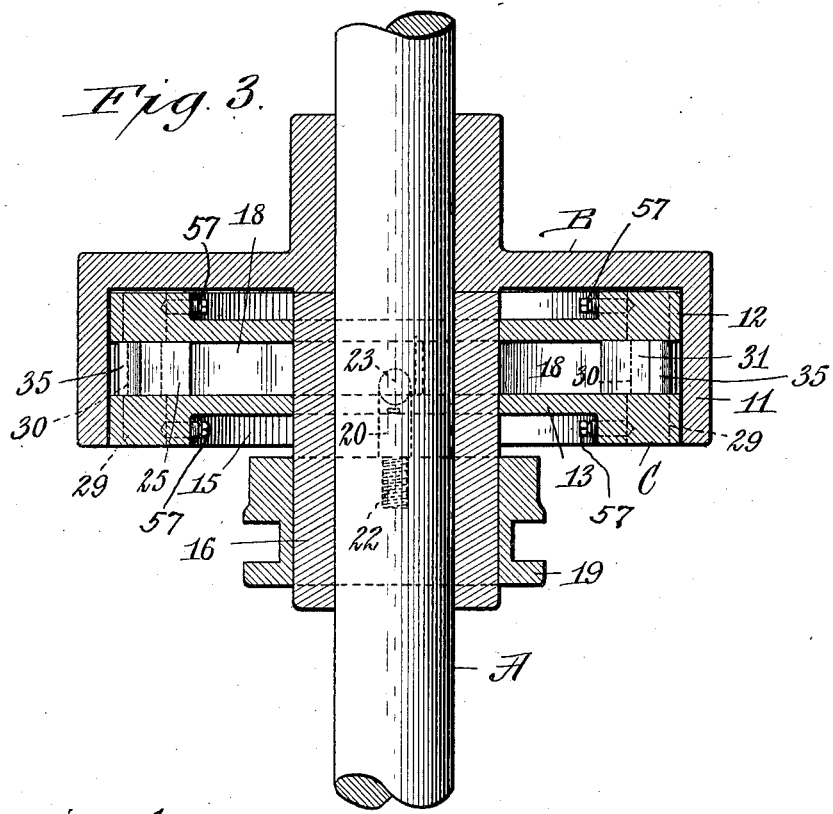
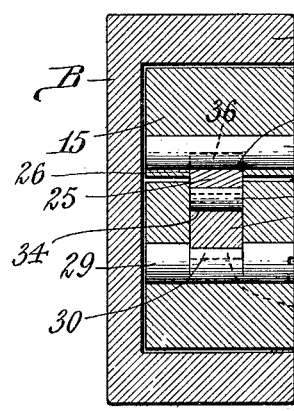
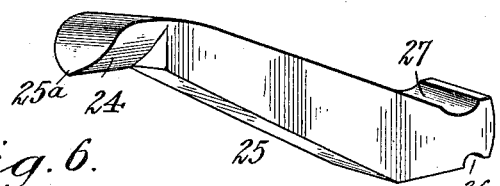
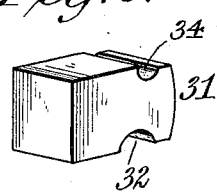
Witnesses:
Jacob Oberst, Jr.
Ella C. Dueckhahn
George W. Shaffer, Inventor.
By Emil Neuhart
Attorney.

G. W. SHAFFER.
FRICTION CLUTCH.
APPLICATION FILED JAN. 23, 1911.
1,029,147.
Patented June 11, 1912.
3 SHEETS—SHEET 3.
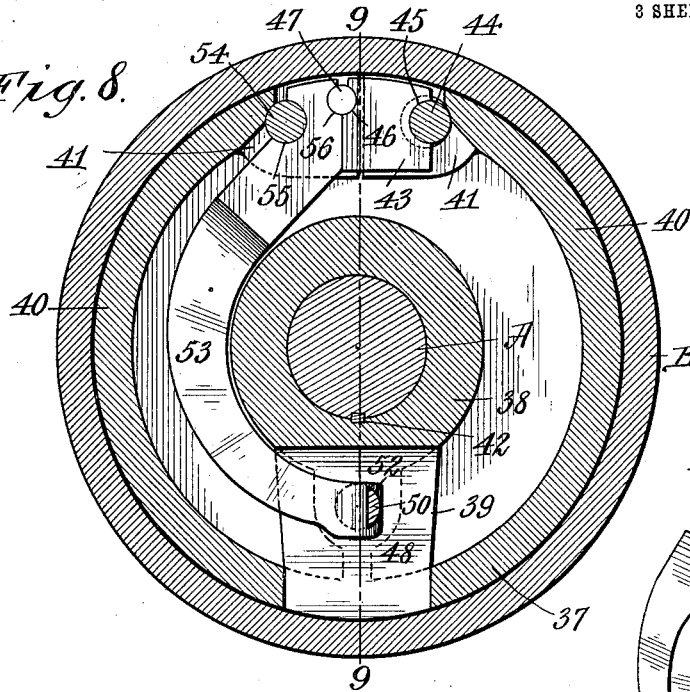
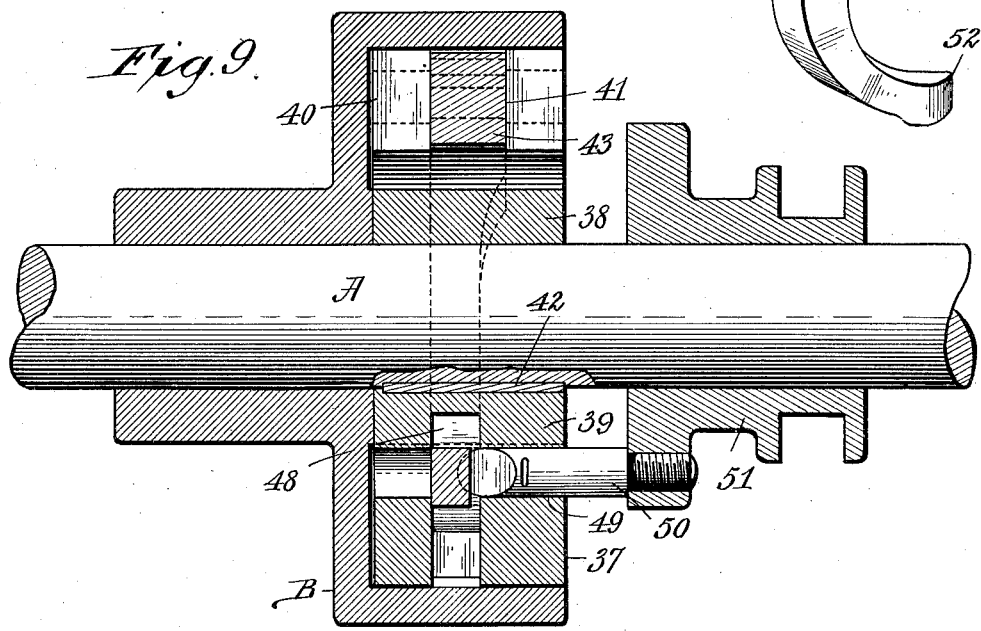
Witnesses:
Jacob Oberst, Jr.,
Ella C. Rueckhahn
George W. Shaffer, Inventor.
By Emil Neuhart
Attorney.
COLUMBIA PLANOGRAPH CO., WASHINGTON, D. C.

UNITED STATES PATENT OFFICE.

GEORGE W. SHAFFER, OF BUFFALO, NEW YORK.

FRICTION-CLUTCH.

1,029,147.  Specification of Letters Patent.  Patented June 11, 1912.

Application filed January 23, 1911. Serial No. 604,110.

*To all whom it may concern:*

Be it known that I, GEORGE W. SHAFFER, a citizen of the United States, residing at Buffalo, in the county of Erie and State of New York, have invented certain new and useful Improvements in Friction-Clutches, of which the following is a specification.

My invention relates to friction clutches and more particularly to that class of clutches in which a split ring or segmental friction-shoes are adapted to impinge against the rim of a pulley or other similar part, whereby the shaft to which the clutch is applied is to drive or be driven by the pulley engaged by said ring or shoes.

The primary object of my invention is the provision of a clutch mechanism of this character which is simple, compact, cheap in construction, and easily adjusted for taking up wear; and it also has for its object the production of a clutch so arranged and constructed that maximum leverage is obtained with a comparatively slight movement of the shifting member, and to render the clutch more reliable and secure in action.

To these ends the invention consists in the construction, arrangement and combination of parts to be hereinafter described and particularly pointed out in the subjoined claims.

Figure 1:
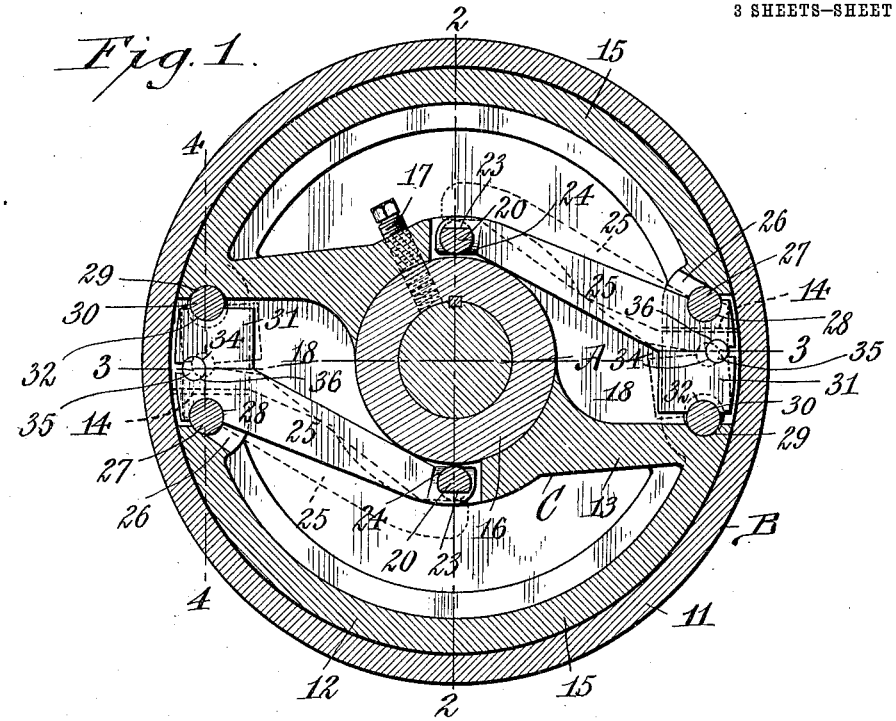
Figure 2:
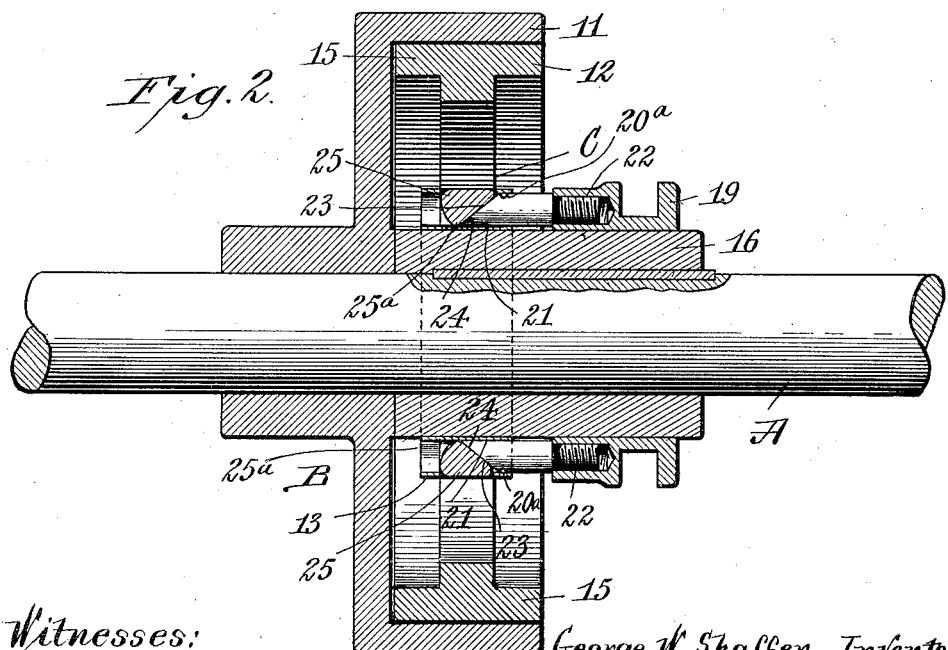

In the drawings,—Figure 1 is a transverse section through a pulley and shaft having my improved clutch-mechanism applied thereto, also shown in section. Fig. 2 is a diametral section taken on line 2—2, Fig. 1. Fig. 3 is a diametral section taken on line 3—3, Fig. 1. Fig. 4 is a transverse section taken on line 4—4, Fig. 1. Fig. 5 is a detached perspective view of one of the actuating levers. Fig. 6 is a detached perspective view of one of the spreading blocks coöperating with the actuating levers. Fig. 7 is a detached perspective view of one of the shifter-pins. Fig. 8 is a transverse section of a shaft and clutch embodying my invention in modified form. Fig. 9 is a diametral section taken on line 9—9, Fig. 8. Fig. 10 is a detached perspective view of the actuating lever employed in this modified form.

Referring now to the drawings in detail, like characters of reference refer to like parts in the several figures.

The reference letter A designates a shaft on which is loosely mounted a pulley B adapted to be frictionally engaged by the expansible part of the clutch-mechanism C which is keyed to said shaft so as to rotate therewith. With this arrangement of parts the clutch may serve as a means for causing the shaft to be rotated by the pulley or the pulley to be rotated by the shaft, depending on whether the shaft or pulley is the driving part; but these parts may be otherwise arranged, such as for connecting separated and alined shafts, as is common in driving or transmission-mechanism. The drawings forming part of this specification therefore illustrate one of several ways in which the clutch may be applied to driving or transmission mechanism for driving one part from another.

The pulley B is preferably constructed with a peripheral contact-rim 11 of sufficient width for co-action with a split ring 12 surrounded by said rim and adapted, in the construction shown, to be expanded against the internal face of the rim. This split ring has a diametral arm 13 connecting it at diametrically opposite points and is formed in piece with said arm. The rim is split at two points in the embodiment of my invention disclosed in Figs. 1 to 4, as at 14, forming two segmental friction-shoes 15, each extending from one end of the arm 13 to the other end thereof from which it is separated, one shoe extending from one end of the arm 13 and the other from the opposite end thereof. The arm 13 has a hub provided with a central opening so as to fit over a sleeve 16 keyed to the shaft A, said arm being secured to said sleeve by means of a set screw 17. The split ring and the arm 13 therefore rotate with the shaft A and sleeve 16 around said shaft, and may well be termed the "expansible-member." The arm 13 is recessed on opposite sides of the sleeve 16 to form pockets 18 which extend from said sleeve to the periphery of the expansible-member, said pockets opening at opposite sides of the arm, as clearly shown in Fig. 1.

Slidable on the sleeve 16 is a shifting-collar 19, such as commonly used in friction clutches, which may be moved lengthwise on said sleeve in any approved manner, said shifting collar having shifter pins 20 extending therefrom with their free ends entering openings 21 formed in the arm 13 or more particularly in the hub of said arm. These openings are formed in the hub at diametrically opposite points and open into or intersect the inner ends of the pockets 18.

I preferably reduce the diameter of the shifter pins at their outer ends and thread them into the shifting collar 19, as at 22. The inner ends of these pins are beveled, as at 23, and engage the beveled inner ends 24 of a pair of actuating arms or levers 25 which partly extend into the pockets 18. Upon actuation of said shifter pins, the inner ends of said actuating arms or levers are swung outward until they have cleared the beveled ends of said pins when they are held in their outermost positions by the cylindrical portions of said pins. In order to prevent accidental dislodgment of the pins from underneath the actuating arms, each pin has a slight depression 20$^a$ formed therein adjacent the beveled surface, in which depression the pointed lower edges 25$^a$ of the actuating arms or levers 25 are adapted to enter, said pointed edges being created by beveling the inner ends of said arms or levers. In this manner a positive locking of the parts is obtained so that when the parts of the clutch are engaged, such jarring as they may be subjected to could not cause their disengagement. The outer ends of said levers also extend into depressions or notches 26 formed in the free ends of the friction-shoes, the latter having pins 27 extending therethrough which serve as fulcrums for said arms or levers. The outer ends of said arms or levers are notched at one edge, as at 28, to fit onto said pins, and as said arms or levers swing on said pins as a center, said pins may well be termed "fulcrum-pins".

Where the arm 13 meets the rigid ends of the friction-shoes, adjusting-pins 29 are rotatably fitted in the expansible-member, each pin having an intermediate eccentric portion 30 against which is placed an oscillating spreader block or member 31 having a curved notch 32 in one edge fitting said eccentric portion. The adjusting pins are retained in any adjusted position by means of set screws 57 threaded through portions of the friction-shoes and impinging against said pins, as best shown in Fig. 3. For the purpose of conveniently turning the adjusting-pins, each has a kerf 33 at one end into which can be placed the end of a screwdriver or other similar tool, thus easily admitting of a very fine adjustment. Said blocks are also provided in their opposite edges with notches 34 in which fit connector-pins 35 also fitting notches 36 formed in the adjacent ends of the actuating arms or levers 25. The connector-pin is arranged slightly out of the plane passing through the axes of the fulcrum-pin and the adjusting-pin, and upon actuation of the levers or arms 25, said connector-pins are moved toward or into said planes by reason of their being confined between the levers and oscillating spreader blocks. When such action takes place, the distance between the fulcrum-pins 27 and the adjusting-pin 29 is increased, thereby causing the friction shoes to be expanded against the internal face of the pulley rim and compelling said pulley to rotate with the shaft, or the shaft with the pulley, as the case may be.

The operation of the device is as follows,—Upon shifting the collar 19, the shifter-pins 20 are forced inward and the beveled inner ends thereof act against the beveled inner ends of the actuating arms or levers to cause them to swing outward with the fulcrum-pins 26 as centers. This movement of the arms or levers carries the connector-pins 35 inward toward the shaft A, and owing to the adjusting-pins 29 being confined within non-yielding parts of the expansible-member, the fulcrum-pins are compelled to move away from the adjusting-pins and as the fulcrum-pins are held within the free ends of the friction-shoes, said shoes are expanded against the pulley rim. When the shoes or pulley rim becomes worn, it is simply necessary to turn the adjusting-pins so as to bring the throw of the eccentric portions thereof closer to the fulcrum-pins, which moves the oscillating blocks, the outer ends of the actuating-levers, and the connector-pins in the direction in which the friction shoes expand, thus taking up the wear to the desired degree in a very simple and effective manner. By reason of the shifter-pins engaging the actuating-levers at a considerable distance from their fulcrum-points, considerable leverage is obtained, which is further augmented by reason of the comparatively short distance between the fulcrum-pins of said levers and the connector-pins, and the further fact that said connector pins are almost in alinement with the axes of the fulcrum and adjusting-pins, thus obtaining a compound leverage which assures secure frictional contact under a load or resistance much greater than heretofore possible in clutches of similar sizes.

The construction above described is highly effective for all sizes of clutches, but I preferably embody the same principle contained therein in slightly modified form for small size clutches, as clearly illustrated in Figs. 8 to 10, wherein the expansible-member has a frictional rim 37 connected to a hub 38 by an arm 39, said rim being split at a point diametrically opposite its connection with the arm 39 to provide two friction shoes 40 which have their free ends notched, as at 41. In this instance, the hub 38 is secured directly to the shaft by means of a key 42, instead of through the intervention of an intermediate sleeve. Arranged in the notch 41 of one of the friction-shoes is an oscillating spreader block 43 which extends slightly into the notch 41 of the other friction-shoe. An adjusting-pin 44 similar in construction to those shown in the figures previously described, is rotatably held in the free end of one of the friction-shoes and extends through the notch 41 thereof. The intermediate eccentric portion of said adjusting-pin fits into a notch 45 formed in one edge of the oscillating spreader-block and in the other edge of said block, is a notch 46 into which fits a connector-pin 47 held in the free end of the other friction-shoe. The arm 39 which connects the hub with the friction rim is hollowed out to form a pocket 48, and formed in said arm so as to extend from said pocket to the outer face of said arm, is an opening 49 in which is held for movement a shifter-pin 50 affixed to a shifting-collar 51 slidable on the shaft A. Like the shifter pins previously described, the pin 50 is also beveled at its inner end and co-acts with the beveled end 52 of an actuating lever 53 which extends from within said pocket, partly around the hub 38 and has its other end entered in the notch 41 of the friction shoe in which the connector rim 47 is located. Through said friction-shoe a fulcrum-pin 54 is passed which extends through the notch wherein the end of the actuating-lever is held, said lever having a notch 55 at one edge to receive the fulcrum pin and a notch 56 at its other edge into which the connector pin 47 fits. When the shifting-collar 51 is moved along the shaft, the shifter-pin 50 thereof engages the beveled end of the actuating lever 53 and causes said lever to swing on the fulcrum-pin 54, thereby separating the free ends of the friction-shoes through the action of the spreading-block 43.

It is to be noted that in the construction illustrated in Figs. 1 to 4, the adjusting-pins are passed through rigid parts of the expansible-member and the said pins do not therefore change their positions, whereas in the modification shown and described, both the adjusting and fulcrum pins are moved, owing to the fact that they are both held within parts capable of expanding against the pulley rim.

Having thus described my invention, what I claim is:—

1. A friction clutch comprising a driving and a driven part, one of said parts having a contact-rim and the other part having a pair of friction-shoes fixed at one of their ends and free at their other, the free end of each shoe being notched and having a fulcrum pin extending through said notched end, an actuating lever for each shoe having a notch into which said fulcrum-pin fits and extending inward from said pin toward the fixed ends of said shoes, an oscillating member coöperating with each actuating-lever, an adjusting-pin eccentrically arranged in the fixed end of each friction shoe, said adjusting pins serving as axes for said oscillating members, means for pivotally connecting said oscillating members with the fulcrumed ends of said actuating levers, and shifting means engaging said actuating levers.

2. A friction clutch comprising a driving and a driven part, one of said parts having a contact rim surrounding the other part and said other part comprising a friction rim and a diametral arm having said friction rim separated therefrom at two points to provide a pair of friction-shoes, each having one end rigid with said arm and its other end free, said friction-shoes having their free ends notched and said diametral arms having pockets extending outward to the periphery of said friction rim in line with said notches, a fulcrum pin passing through the notched free end of each friction shoe, an actuating-lever for each friction-shoe having a notch at one edge into which said fulcrum-pin fits, said levers extending toward the fixed ends of said shoes, an adjusting-pin passing through the friction rim at each end of said arm and having an eccentric portion extending into the adjacent pocket of said arm, an oscillating spreader-block at each end of said arm having a notch into which the eccentric portion of said adjusting-pin fits and which is interposed between said adjusting-pin and the fulcrumed end of the actuating-lever, said oscillating-blocks and actuating levers having registering notches in their opposing edges, connector-pins fitting into said registering notches and slightly out of alinement with said fulcrum and adjusting-pins, and a shifting-device engaging the free ends of said actuating-levers.

3. A friction-clutch comprising a driving and a driven part, one of said parts having a contact rim and the other having segmental friction-shoes fixed at one end and free at their other, spreading means co-acting with the free end of each friction-shoe and comprising an oscillating member and an actuating lever fulcrumed to the free end of the friction-shoe, a connector pin interposed between said oscillating member and said actuating lever and an eccentric adjusting pin interposed between said oscillating member and the fixed end of the other friction-shoe, and means for actuating said actuating levers.

4. A friction clutch comprising driving and driven members, one of said members having a contact rim, and the other having a segmental friction shoe fixed at one end and free at its other, spreading means co-acting with the free end of the friction shoe comprising an oscillating block and a co-acting actuating lever, a rotatable pin having an eccentric surface upon which the block bears adapted to adjust the position of said block, a connector pin interposed between said oscillating block and actuating lever, said oscillating block and actuating lever having notches to receive said pin and means for actuating said lever.

In testimony whereof I have affixed my signature in the presence of two subscribing witnesses.

GEORGE W. SHAFFER.

Witnesses:
EMIL NEUHART,
ELLA C. PLUECKHAHN.

Copies of this patent may be obtained for five cents each, by addressing the "Commissioner of Patents, Washington, D. C."